PHONOGRAPH RECORD HOLDER

Filed Nov. 17, 1954

INVENTOR
ARTHUR BRODY
BY Frederick Breitenfeld
HIS ATTORNEY

United States Patent Office 2,777,574

Patented Jan. 15, 1957

2,777,574

PHONOGRAPH RECORD HOLDER

Arthur Brody, South Orange, N. J.

Application November 17, 1954, Serial No. 469,466

2 Claims. (Cl. 206—62)

This invention relates to holders or containers for phonograph records, and has for one of its objects the provision of an envelope which will effectively serve as a protective enclosure for the conventional cardboard sheath within which phonograph records are usually contained.

At the present time, phonograph records are customarily delivered to the purchaser in a cardboard sheath which is open at one end and through which the record is inserted into the sheath. The sheath is commonly formed of superposed elements secured together by adhesive tapes applied along three edges. These cardboard sheaths are usually printed or embellished on one or more faces with pictorial matter or informative material relating to the records placed within them, and it is therefore desirable that the sheaths be preserved, not only to protect the records which they hold, but also to supply to the user the informative material printed on them. Due to repeated handling, both in the stores where records are sold, and by the subsequent purchaser of the records, the sheaths soon become shabby in appearance, soiled or disclored, and moreover, often deteriorate to a point where they break apart at the edges.

It is one of the objects of the present invention to provide an outer protective envelope for this type of conventional cardboard sheath, the enevelope being of a flexible, transparent, tough, wear-resistant material tending to protect both the record and its cardboard sheath. The protective envelope is also provided with means by which the title of the contained record may be displayed in a manner to enable the title to be easily read, whereby the desired record may be readily selected from a number of records arranged in a pile or stacked on a shelf.

It is a further object of the invention to provide improved means by which a record may be protected against scratching or frictional wear when it is being inserted into or being removed from its carboard sheath.

It is another object to provide a transparent, wear-resistant, plastic-material protective envelope for holding a cardboard record sheath, the enevelope being provided with a pocket at its rear end for removably containing a strip bearing informative material as to the nature of the enclosed record.

For the attainment of these and other objects to be hereinafter set forth. I have devised the arrangement of parts described in the following specification and more particularly set forth in the claims appended hereto. In the accompanying drawings, wherein an illustrative embodiment of the invention is disclosed:

Figures 1, 2, 3, 4, 5, 6:
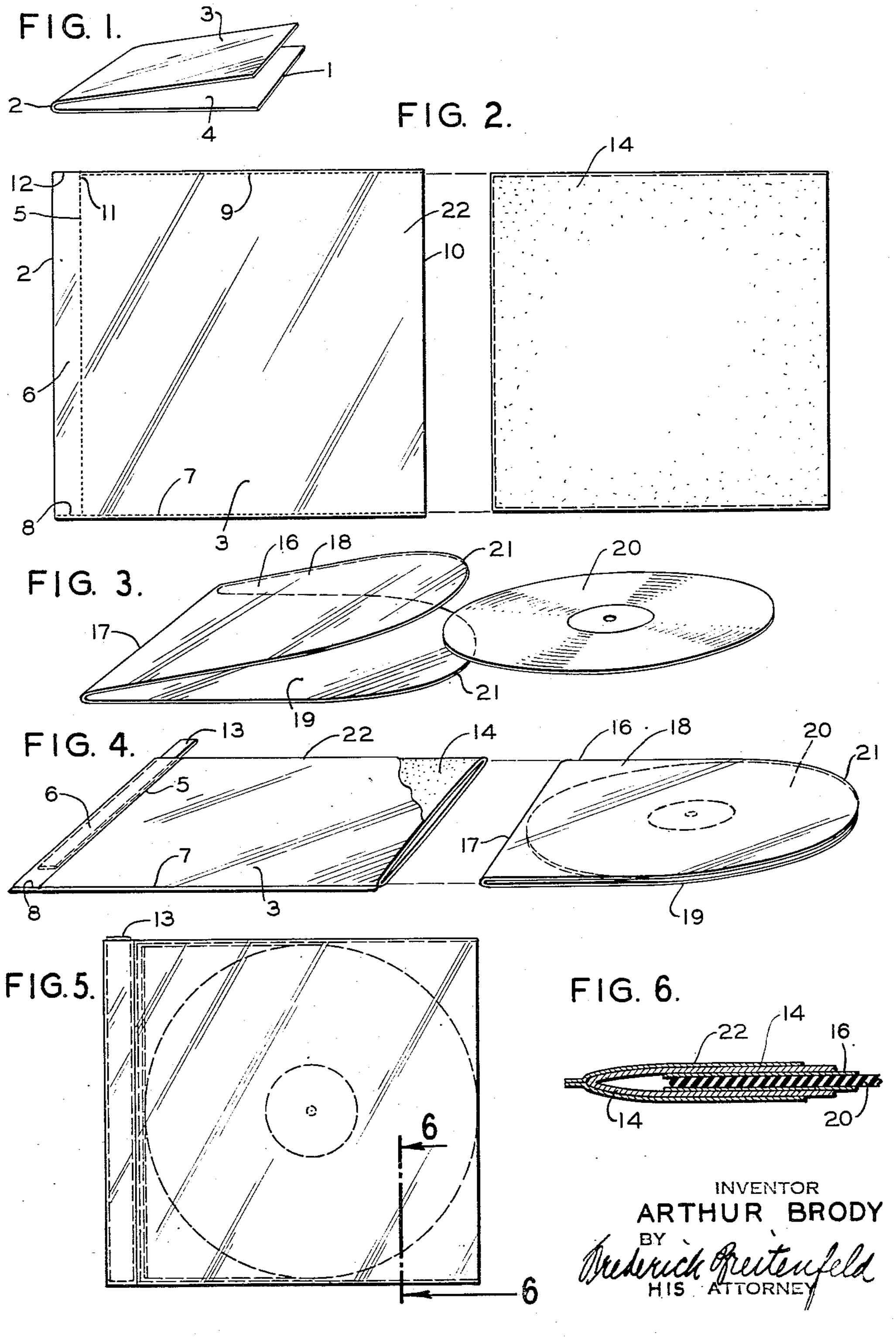
Figure 1 is a perspective view of the sheet or strip of transparent material from which the improved envelope is produced.
Figure 2 is a face view of the envelope and the conventional cardboard sheath adapted for insertion therein.
Figure 3 is a perspective view of a protective strip or shield that may be applied directly to a record before the record is inserted into the carboard sheath shown at the right in Figure 2.
Figure 4 is a view of the protective plastic envelope with the cardboard sheath contained inside of it, and with the record enclosed in its protective strip and in readiness to be inserted into the sheath.
Figure 5 is a face view of the complete record holder showing the cardboard sheath and record within it.
Figure 6 is an enlarged sectional view, taken substantially on the line 6—6 of Figure 5.

Referring to the drawings, 1 indicates generally the sheet or strip of material from which the improved protective envelope is produced. It is preferably composed of relatively thin, flexible and transparent polyethylene or equivalent transparent fusible plastic, and the strip is transversely folded or doubled upon itself, as indicated at 2, to provide the two similarly-sized overlying panels indicated respectively at 3 and 4. The fold indicated at 2 constitutes a closed end for the envelope to be formed, and at a short distance inwardly from this closed end the two panels 3 and 4 are fusibly joined or heat-sealed together along the line indicated at 5. There is thus provided between the seam 5 and the closed end 2, an elongated pocket indicated at 6.

Along one edge, the panels 3 and 4 are fused together by a seam 7 produced by heat-sealing or other suitable means of joinder. The seam 7 extends along the entire edge of the panels and thus closes one end of the tubular pocket 6, as indicated at 8.

Along the opposite edge of the folded strip 1 is a seam 9, which is also produced by heat-sealing or other suitable means or joinder, and it will be noted that the seam 9 starts at the open end 10 of the envelope, and terminates at the transverse seam 5, i. e., at the point designated 11. Thus, there is provided an open mouth 12 at one end of the tubular pocket 6 through which an elongated strip 13 of cardboard, stiff paper, suitable plastic or other material may be inserted for accommodation within the pocket 6. The strip 13 is intended to receive the title of the record to be housed within the envelope, or other informative material, and is clearly readable through the transparent material of the envelope.

At present, phonograph records are usually sold in stiff cardboard sheaths, which are in the form of a flat envelope or sleeve into which the record is inserted. These cardboard sheaths afford protection for the records and are thus desirable to keep indefinitely as protective enclosures for the records. However, handling and use soon cause the cardboard sheath to become shabby or damaged, defaced or destroyed and hence protection for it is desirable. In the drawing, one of these cardboard sheaths is shown at 14. In accordance with my invention, the record 20 is placed within it in the conventional manner, and then the cardboard sheath, holding the record, is inserted through the open end 10 of the transparent envelope 22 and will be thereupon snugly housed therein, substantially as shown in Figure 5.

It will be noted that when the cardboard sheath and its contained record are inserted into the transparent envelope, the entry into the envelope will be halted at the seam 5, so that the pocket 6 projecting beyond an end of the inserted cardboard sheath will be free to hold its informative strip 13 separately and independently of the remainder of the envelope. The seam indicated at 5 constitutes a flexible of pivotal connection between the pocket 6 and the remainder of the envelope 22 and thus permits the pocket 6 to be flexed to lie at an angle to the remainder of the envelope. This facilitates the easy reading of the informative material printed on the strip 13 and visible through the transparent material of which the entire envelope is composed. This is particularly convenient when a number of records are stacked one upon another or arranged on a shelf, as is the practice in many stores dealing in records.

It has been found that damage is often done to records by repeated insertion into and removal from the conventional cardboard sheaths 14. The device disclosed in Figures 3 and 4 is intended to reduce the likelihood of such damage. It consists of a protective strip 16 of sheet material transversely folded or doubled upon itself, as shown at 17, to form the two overlying plies 18 and 19 between which the record 20 is sandwiched. The panels 18 and 19 are rounded at their free ends, as shown at 21, to conform to the peripheral shape of the record placed between them. This protective strip 16 may be composed of cardboard, plastic sheet, or other suitable material and is preferably smooth or polished nature so that the faces contacting the grooved surfaces of the record will not frictionally or otherwise damage them.

In using the protector 16, the record is placed between the plies 18 and 19 and this is done while the protector is open like a book. Then the record and its protector, at this time appearing as seen at the right in Figure 4, may be slid into the cardboard sheath 14 without frictional contact between the record itself and the mouth of the sheath. The sheath 14 may be contained within the transparent envelope 22, or may be outside of the envelope and inserted into it after the record has been accommodated.

When the cardboard sheath 14 is housed within the protective transparent envelope 22, both the sheath and the record contained within it will be protected and the useful life of both will be materially increased. When a protective strip as shown at 16 is applied to the record before the record is inserted in the cardboard sheath 14, the record will be protected to a still further extent, since it and the protective strip 16 may be inserted as a unit into and removed from the cardboard sheath, hence frictional contact of the faces of the record with parts of the cardboard sheath 14 will be at all times avoided. To remove the record from between the plies 18 and 19 of the protective strip 16 merely requires that the strip be opened like a book and the record lifted up, thus avoiding any sliding frictional contact of the grooved faces of the record with parts of the protective strip 16.

Having described only a single embodiment of the invention, it will be obvious that the invention is not to be restricted thereto, but is broad enough to cover all structures coming within the spirit and scope of the annexed claims.

Having thus described my invention what I claim as new and desire to secure by Letters Patent is:

1. A phonograph record holder comprising a cardboard sheath in which a record is contained, a protective envelope within which the sheath and its contained record are placed, said envelope being composed of transparent sheet material and being open at one end to enable the record-holding sheath to be placed within it, the envelope being closed at its opposite end, the envelope being transversely seamed adjacent to its closed end to provide an elongated pocket between said seam and said closed end, the envelope being seamed along opposite edges, one of said edge seams operating to close one end of the elongated pocket, the second edge seam terminating at the transverse seam, thereby leaving the second end of said pocket open.

2. A record holder comprising a record-holding sheath of stiff cardboard, a protective envelope within which the sheath is removably fitted, said envelope being composed of transparent plastic and provided with an elongated pocket at its rear end extending beyond the rear end of the sheath when the sheath is fitted in the envelope, the pocket being open at one end and constituting an integral extension of joined front and back panels of the envelope, said front and back panels being fused together in a transverse seam adjacent to the end of the envelope, said seam constituting a flexible hinge line upon which the pocket can be flexed, and a strip containing informative material fitted within the pocket and removable out of the open end of the pocket.

References Cited in the file of this patent

UNITED STATES PATENTS

| | | |
|---|---|---|
| 1,150,538 | Rosenberg | Aug. 17, 1915 |
| 1,295,763 | Kohn | Feb. 25, 1919 |
| 1,379,198 | Markgraf | May 24, 1921 |
| 2,245,738 | Taylor | June 17, 1941 |
| 2,384,633 | Markowski | Sept. 11, 1945 |
| 2,512,577 | Franck | June 20, 1950 |
| 2,518,711 | Mulford | Aug. 15, 1950 |
| 2,544,844 | Liber | Mar. 13, 1951 |
| 2,584,633 | Southwick | Feb. 5, 1952 |

FOREIGN PATENTS

| | | |
|---|---|---|
| 897,993 | Germany | Nov. 26, 1953 |